Oct. 25, 1960     F. P. ANDERSON ET AL     2,957,358
OVER CENTER LEVER ASSIST MECHANISM
Filed July 14, 1958
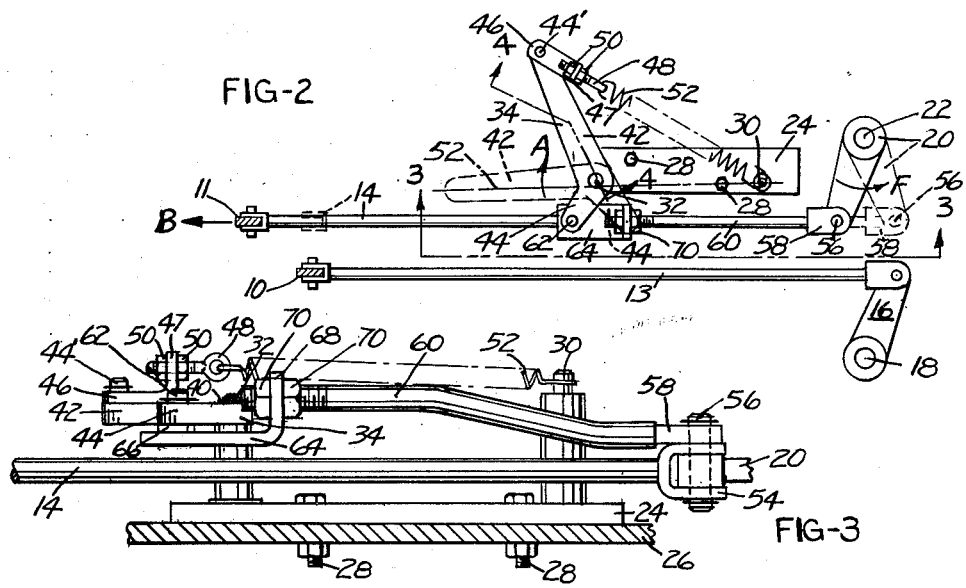
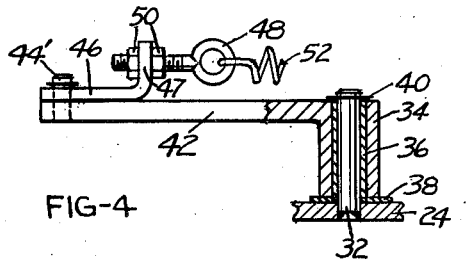
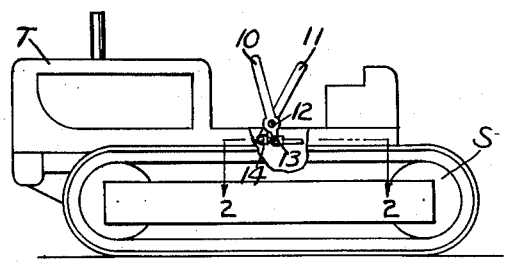
FRANK P. ANDERSON
EDWIN E. ANDERSON
RAYMOND L. ANDERSON
*INVENTORS*
BY

United States Patent Office 2,957,358
Patented Oct. 25, 1960

2,957,358

OVER CENTER LEVER ASSIST MECHANISM

Frank P. Anderson, Edwin E. Anderson, and Raymond L. Anderson, all of Rte. 1, Medical Lake, Wash.

Filed July 14, 1958, Ser. No. 748,316

1 Claim. (Cl. 74—97)

This invention relates to the control of biased clutches, and particularly to those clutches actuated by hand.

Most endless track-type tractors are steered by declutching the drive mechanism for the track on the inside of the turn. Because considerable drive torque is required in devices of this type, such clutches must have powerful engagement springs to avoid slippage. Therefore with the conventional control lever arrangement existing in tractors of this type the forces required for manipulating the controls for maneuvering the tractor are quite fatiguing to the operator over a period of time.

Our invention seeks to reduce this operator fatigue by providing a means for reducing the control forces required to be applied by the operator on the hand levers without reducing the power transmitting abilities of the clutches.

Another advantage of our invention lies in the provision of an over-center lever assist mechanism which may augment the effect of the clutch springs when the clutches are engaged.

Still another advantage of our invention lies in the provision of an over-center lever assist mechanism which reduces the tendency of the levers to vibrate when the clutches are engaged and thus contributes to the comfort of the operator and the reduction of wear to the clutch linkage.

A preferred embodiment of our invention is shown in the accompanying drawings wherein:

Figure 1 is a side elevation of an endless track-type tractor with a portion broken away to show the mounting of the clutch control levers;

Figure 2 is a plan view of the linkage connecting the control levers and the clutch operating levers, wherein one clutch is provided with our invention;

Figure 3 is a longitudinal elevation of the assist mechanism associated with a fragmentary portion of the conventional linkage as at line 3—3 of Figure 2, and having a part in section; and Figure 4 is a view taken substantially on the planes indicated by line 4—4 of Figure 2.

In Figure 1, T represents a conventional track-type tractor which is steered by declutching one or the other track-driving sprockets S. 10 is a control lever in its normal position and 11 is the other control lever which is disposed in the actuated position wherein the sprocket S is disengaged from the drive mechanism (not shown). Both levers are pivoted about fulcrums 12 fixed with respect to the tractor frame. Pivotally connected to said control levers are pull rods 13 and 14 which transmit the motion of the control levers to the clutches. At its opposed end, pull rod 13 is pivotally connected to a clutch operating lever 16 which is keyed or otherwise secured to the clutch throw-out shaft 18. Pivotally connected to a clutch operating lever 20 is a pull rod 14 associated with the control lever 11.

A base plate 24 is fastened to the tractor frame 26 by means of bolts 28. One end of base plate 24 has an anchor post 30 and at the other end we provide a fixed journal pin 32. On journal pin 32 a bell crank 34 with a bushing 36 and a thrust washer 38 is mounted and held in place by means of a retaining ring 40. Bell crank 34 has a driving arm 42 and a driven arm 44 angularly disposed at opposite sides of its center. Driving arm 42 has a pin 44' rigidly secured to its end to accommodate a pivot bracket 46. Bracket 46 carries an eyebolt 48 which is fastened to upwardly extending leg 47 by means of nuts 50, to provide means for adjustment. A prime mover in the form of a helical tension spring 52 is connected to eyebolt 48 and anchor post 30.

Pull rod 14 has a clevis 54 which receives clutch arm 20. Normally at this point the pivot pin would only be long enough to extend beyond the outer faces of the clevis fork plus the length needed for retention. With the addition of our assist mechanism, this pivot pin 56 must be extended in length to accommodate the flattened end 58 of an offset link 60 which transfers the assist force from the assist mechanism prime mover 52 to the clutch as will now be shown.

The driven arm 44 of the bell crank 34 is pivotally connected to pin 62 which is staked, welded, or otherwise secured to bracket 64 with a spacer 66 to provide clearance between the pivotally connected parts. An upwardly disposed leg 68 of bracket 64 is drilled to receive the threaded end of link 60 which is secured and adjusted with nuts 70. Link 60 is offset as shown to provide the necessary physical clearance between the parts for the operation of our device.

In Figure 2 by means of the full line disclosure the relative parts are shown in full lines for the disengaged position of the clutch, and in broken line for the engaged position.

In Figure 2 the force required to hold the clutch in disengagement is indicated by B. This force is opposed by torque F generated by the clutch springs. In the position shown, spring 52 exerts a torque A opposite in direction to torque F which decreases the force B required to hold the clutch in the disengaged position. When the turn has been executed and the clutch again engaged, the elements return to the positions shown by broken lines. As the clutch approaches the fully engaged position, driving arm 42 sweeps to shift spring 52 toward journal pin 32 and shortly before the clutch is completely engaged, spring 52 crosses over the center of journal pin 32 to a position on the opposite side of journal pin 32 as shown by a dot-dash line representing the center line of spring 52. Thus when the clutch is completely engaged, the moment A generated by the spring reverses in direction from that shown by the arrow A to the same direction as moment F. So spring 52 in this position assists the clutch springs in transmitting engine torque to the track drive sprocket. In addition to this, the action of spring 52 assists in immobilizing all clutch linkage, eliminating chattering and vibration, and reducing the wear caused by this chattering and vibration.

Having thus described our invention, we claim:

In a control device having a manually actuable fixed fulcrum lever movable alternately between a normal position and an actuated position; a pull rod pivotally connected to said lever and actuated thereby; said pull rod having its end opposed to said lever pivotally connected to a clutch operating lever adapted to disengage a biased normally engaged clutch when said lever is in said actuated position: an over-center lever assist mechanism comprising a base plate removably fixed relative to the fulcrum of said lever; a fixed journal pin carried by said base plate; a bell crank journaled on said journal pin and having a driven arm and a driving arm disposed at opposed sides of said journal; a link pivotally connected at one end to said driven arm and its opposed end being pivotally connected at the connection of said pull rod to said clutch operating lever by a manually releasable connection; an anchor post fixed on said base plate at a point spaced from said journal pin and opposed to said lever; a tension spring secured at one end to said anchor post and pivotally connected at its opposed end to said driving arm; and said driving arm having a sweep movement about said journal pin opposed to said anchor post for effecting movement of said tension spring over center of said journal post.

References Cited in the file of this patent

UNITED STATES PATENTS

| | | |
|---|---|---|
| 1,793,175 | Holmes | Feb. 17, 1931 |
| 2,311,997 | Pearson | Feb. 23, 1943 |
| 2,399,150 | Snider | Apr. 23, 1946 |
| 2,544,811 | Straub | Mar. 13, 1951 |
| 2,621,538 | Bechman et al. | Dec. 16, 1952 |
| 2,782,879 | Dorey | Feb. 26, 1957 |